Aug. 4, 1925.
G. W. FRY
1,548,451
SPLINE BROACH OR CUTTING BAR
Filed April 28, 1924
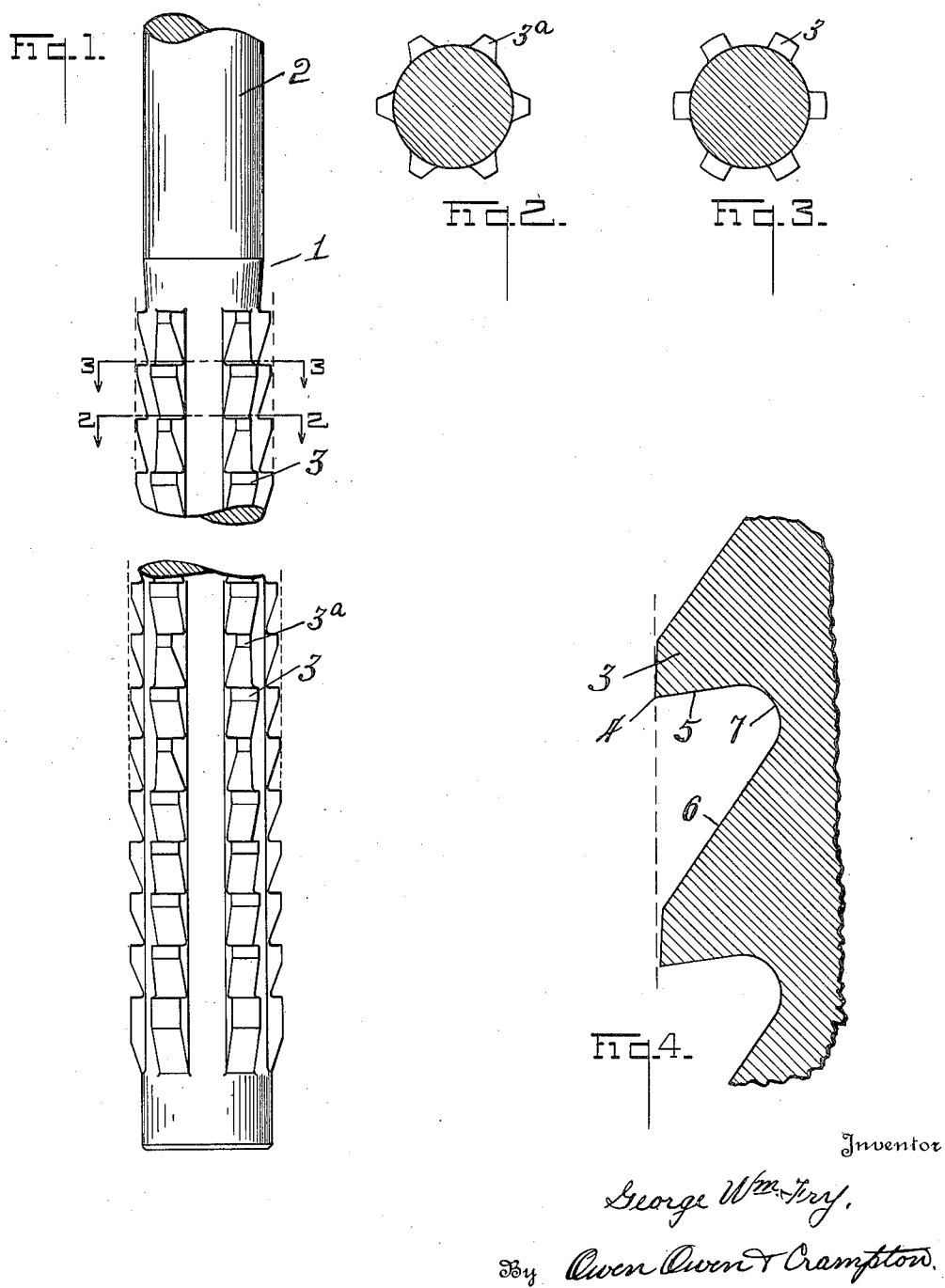

Patented Aug. 4, 1925.

1,548,451

UNITED STATES PATENT OFFICE.

GEORGE WILLIAM FRY, OF TOLEDO, OHIO.

SPLINE BROACH OR CUTTING BAR.

Application filed April 28, 1924. Serial No. 709,357.

*To all whom it may concern:*

Be it known that I, GEORGE WILLIAM FRY, a citizen of the United States, and a resident of Toledo, in the county of Lucas and State of Ohio, have invented a new and useful Spline Broach or Cutting Bar, which invention is fully set forth in the following specification.

This invention relates to a broaching tool adapted particularly for cutting spline grooves or longitudinally extending ways in the walls of the hub openings of gear wheels and other objects.

The object of the invention is the provision of a broaching tool of the class described, adapted, in a single operation, to both rough and finish the cutting of one or more spline grooves in a work piece, and which, so far as I am aware, operates with considerably more speed, requires less power to operate, and has much longer life than tools heretofore used for the purpose, as well as producing a better quality of product.

The invention is fully described in the following specification, and while in its broader aspect it is capable of embodiment in numerous forms, a preferred embodiment thereof is illustrated in the accompanying drawings, in which, Figure 1 is an elevation of a tool embodying the invention, with parts broken away. Figs. 2 and 3 are cross sections on the lines 2—2 and 3—3, respectively, in Fig. 1, and Fig. 4 is an enlarged fragmentary longitudinal section through a plurality of teeth of a row.

The tool embodying the invention comprises a straight bar 1 of considerable length and of circular form in cross section especially where it is intended to operate in holes of true cylindrical form. The bar has at one end a shank portion 2 adapted for engagement with the tool engaging chuck of a suitable power drawing machine.

The working portion of the tool, which in practice is of considerable length, has, in a multiple groove cutting tool, a plurality of circumferentially spaced, longitudinally extending rows of radially projecting teeth 3, the cutting edges or noses 4 of which are directed in the direction of pull or cutting movements of the tool through the work.

The teeth of each row are progressively increased in radial length from the forward or initial cutting end of the row to the other, so that each tooth takes a slightly deeper bite than the preceding tooth. In practice, each tooth, except the last four or five teeth of a row, is lengthened approximately .003 of an inch over the preceding tooth, and the length of the working portion of the tool is sufficient to enable the desired number of teeth to be provided in a row so that the combining cutting action thereof will produce a groove of the desired depth in the work. The progressively lengthened teeth are the roughing teeth of the tool, while the last few teeth of a row, which are of the same length, are the finishing teeth.

In order to reduce the power required to draw a tool through the work during a broaching operation, every other one of the roughing teeth of a row has its cutting end narrowed so as to take approximately one-half the width of cut of the next tooth, the sides of the narrow teeth, which are designated 3ª, preferably tapering outward so that at their bases they are of the same width as the other teeth. The finishing teeth, however, are of uniform width.

The front faces 5 of the teeth which terminate at their outer ends in the cutting edges 4, are slightly tapered outward from their inner ends in the direction of cutting movement of the tool, and are connected to the rear inclined surface 6 of the preceding tooth by a curve 7. The pockets between the teeth are of suitable size to receive the shavings cut from the work by the teeth, and such pockets are preferably of a depth substantially equal to the depth of the grooves to be cut.

It is found in practice that with my tool a plurality of spline grooves can be quickly cut in a work piece, the roughing and finishing of the grooves being effected in a single operation; that the tool will operate with considerably more speed and under less power than has heretofore been possible with tools of this character, and that it has a longer life under hard usage than other tools. It is also found that by the use of my tool, there is a considerable improvement in the quality of work produced over that of other tools.

I wish it understood that my invention is not limited to any specific construction, arrangement or form of the parts, and is capable of numerous modifications without departing from the spirit of the claims.

Having thus described my invention, what

I claim as new and desire to secure by Letters Patent is,—

1. A tool of the class described comprising a bar, having a longitudinally extending row of radially projecting teeth for rough cutting and finishing a groove, the rough cutting teeth being progressively lengthened rearwardly from the initial cutting end of the row, alternate roughing teeth being narrowed at their cutting ends with respect to the others.

2. A tool of the class described comprising a bar, having a plurality of circumferentially spaced, longitudinally extending rows of teeth for rough cutting and finishing respective grooves in a work piece at a single drawing operation of the tool, the roughing teeth being progressively lengthened rearwardly from the initial cutting end of the rows, and alternate roughing teeth having their cutting ends of less width than the other teeth.

3. A tool of the class described comprising a bar, having a plurality of circumferentially spaced, longitudinally extending rows of teeth for rough cutting and finishing respective grooves in a work piece at a single drawing operation of the tool, the roughing teeth being progressively lengthened rearwardly from the initial cutting end of the rows, and alternate roughing teeth having their cutting ends of less width than the other teeth, the sides of the narrow teeth tapering to a width at the bases of the teeth substantially equal to the width of the other teeth.

In testimony whereof I have hereunto signed my name to this specification.

GEORGE WILLIAM FRY.